UNITED STATES PATENT OFFICE.

OTTO FISCHER, OF MUNICH, GERMANY.

ROSANILINE-RED COLORING-MATTER.

SPECIFICATION forming part of Letters Patent No. 252,202, dated January 10, 1882.

Application filed May 23, 1881. (Specimens.)

*To all whom it may concern:*

Be it known that I, Dr. OTTO FISCHER, of Munich, Bavaria, in the Empire of Germany, have invented a new Method of Preparing Rosaniline, of which the following is a specification.

My invention relates to the production of a coloring-matter from paranitrobenzaldehyde and crude or commercial aniline-oil, as fully described hereinafter.

The main feature of my invention consists in the formation of nitroleuco bases from paranitrobenzaldehyde and commercial aniline-oil in the presence of dehydrating agents, from which nitroleuco bases I can produce a rosaniline-red either direct or after the transformation into leucaniline. A process of this character is described in the Letters Patent granted to me October 11, 1881, No. 248,154.

By "aniline-oil" I mean a mixture of aniline, toluidine, and xylidine. A mixture of fifteen parts of paranitrobenzaldehyde, twenty-six parts of hydrochlorate of aniline prepared from commercial aniline-oil, or the corresponding quantity of another salt prepared from commercial aniline-oil, and of twenty-six parts of zinc chloride is heated at 212° Fahrenheit (100° centigrade) until the smell of paranitrobenzaldehyde has disappeared. The reaction product will contain nitrodiamidotriphenylmethan, the formation of which is explained by the following formula: $NO_2C_6H_4CHO + 2C_6H_5NH_2 = NO_2C_6H_4CH(C_6H_4 NH_2) + H_2O$.

From the smelt obtained by the above-described method the nitroleuco base is obtained by dissolving the smelt in water, by filtering the solution produced, and by adding to it soda lye in excess. The nitroleuco base precipitates in the form of a yellowish deposit. By heating in an oil-bath at 320° to 356° Fahrenheit (160° to 180° centigrade) this nitroleuco base with chloride of iron or with other metallic salts of similar effect until the mixture forms a homogeneous bronze-like mass, I obtain direct rosaniline, which can be purified in the usual manner.

To produce leucaniline I heat the nitroleuco base in acid solution with the necessary quantity of zinc-powder, (of course the other usual reduction agents can also be used,) and from the obtained solution of zinc oxide and leucaniline salt I separate the leucaniline by soda lye.

The oxidation of the leucaniline into rosaniline is made by means of the well-known agents, such as manganese dioxide, lead dioxide, chloranil, &c.; and the obtained rosaniline is purified by crystallization. The rosaniline-red compound thus produced has the properties of the ordinary rosaniline-red produced by the known methods.

I do not limit myself to the exact proportions, as they may be varied without departing from the principle of my invention.

I claim as my invention—

As a new article of manufacture, the herein-described red coloring-matter, consisting of rosaniline prepared from paranitrobenzaldehyde and a salt of commercial aniline-oil, and having the qualities as hereinabove set forth.

In testimony whereof I have signed my name to this specification in the presence of two subscribing witnesses.

OTTO FISCHER.

Witnesses:
CHARLES J. BELL,
EMIL HENZEL.